United States Patent [19]

Hoshiro et al.

[11] Patent Number: 4,798,567
[45] Date of Patent: Jan. 17, 1989

[54] POWER TRANSMISSION BELT

[75] Inventors: Takeshi Hoshiro, Hyogo; Mu Matsuo, Shizuoka; Hiroshi Takano, Hyogo, all of Japan

[73] Assignee: Mitsuboshi Belting, Limited, Japan

[21] Appl. No.: 163,657

[22] Filed: Mar. 3, 1988

[30] Foreign Application Priority Data

Mar. 4, 1987 [JP] Japan .................................. 62-50961
Jun. 15, 1987 [JP] Japan ................................ 62-149781

[51] Int. Cl.$^4$ ............................ F16G 1/22; F16G 5/18
[52] U.S. Cl. .................................... 474/242; 403/122; 474/245
[58] Field of Search ............... 474/201, 206, 240, 237, 474/242-245; 403/76, 122, 141, 143

[56] References Cited

U.S. PATENT DOCUMENTS 3,781,047 12/1973 Surko, Jr. ..................... 403/122 X
3,787,128 1/1974 Maistrelli ...................... 403/122 X

FOREIGN PATENT DOCUMENTS 0515513 4/1921 France ................................ 474/245
0637759 5/1928 France ................................ 474/245

Primary Examiner—Thuy M. Bui
Attorney, Agent, or Firm—Wood, Dalton, Phillips, Mason & Rowe

[57] ABSTRACT

A power transmission belt having a flexible chain link midportion 11 defining a longitudinally continuous belt structure having opposite laterally outer side portions. Mounting elements 14,15 protrude from the side portion at spaced intervals longitudinally of the belt and side elements 16 are freely adjustably mounted one each to the protruding mounting element portions 15. The side elements define an outer surface for engaging the sidewall of a drive pulley V-groove. The invention further comprehends the provision of positioning elements 26 for retaining the side elements on the mounting elements, with the outer surfaces 17 of the side elements generally parallel to the V-groove sidewalls of the pulley for facilitating facial engagement of the side elements with the sidewall of the pulley groove when brought thereinto.

27 Claims, 2 Drawing Sheets

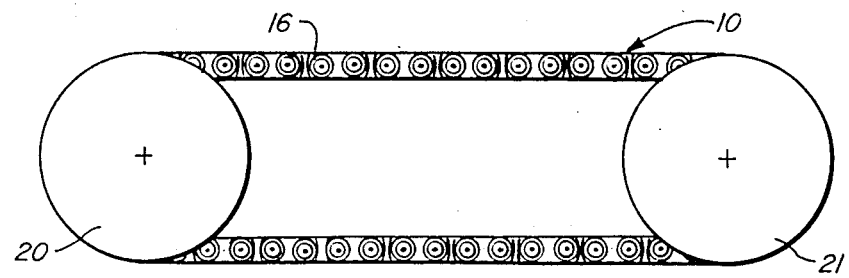
FIG. 1
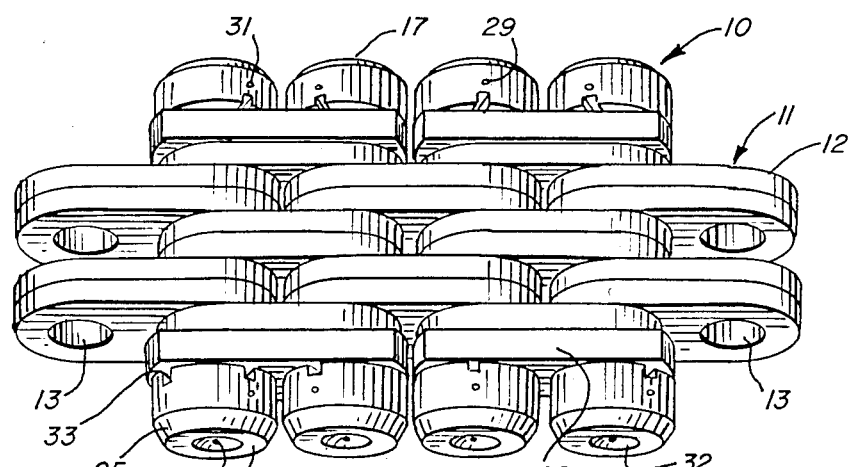
FIG. 2
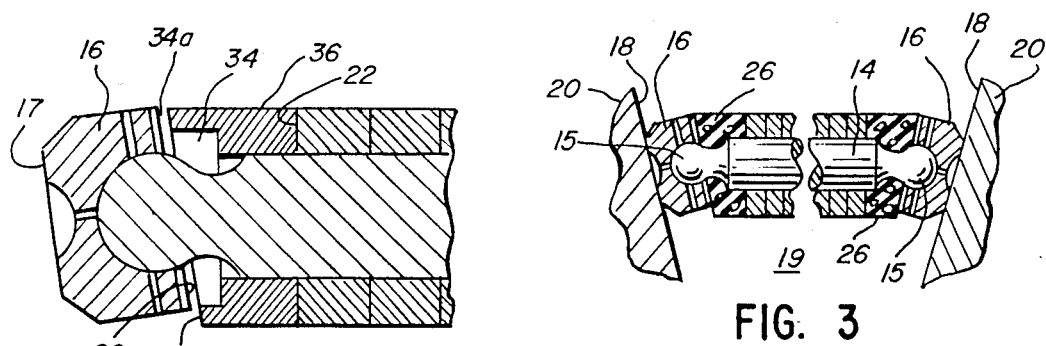
FIG. 9
FIG. 3
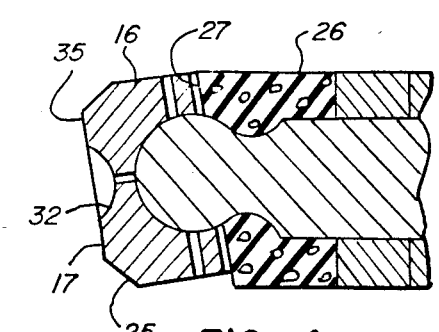
FIG. 4
FIG. 5
FIG. 6

POWER TRANSMISSION BELT

TECHNICAL FIELD

This invention relates to power transmission belts and in particular to V-belts adapted to be engaged by drive pulleys having V-shaped grooves.

BACKGROUND ART

A longstanding, vexatious problem in the V-belt power transmission art is the need for accurate facial engagement between the side edges of the V-belt and the sidewall faces of the pulley about which the V-belt is trained in the power transmission operation. If the V-belt side faces are not accurately parallel to the pulley groove sidewall faces, increased wear, heat generation, and noise result.

In one form of known power transmission V-belt, the midportion of the belt is formed as a chain, and the side edges are defined by blocks fixedly secured to the sides of the chain portion. It has been found that the outer side surfaces of the blocks secured to the chain portion may not be at the same angle of convergence as the sidewall faces of the pulley groove, and rapid wear of the blocks has resulted. Even more seriously, it has been found that because of insufficient engagement between the blocks and the pulley groove sidewalls, mechanism, such as brakes of the drive system, may not be actuated. Where the load to be transmitted is very high, it has been found that insufficient force transfer between the belt and pulleys results from the incomplete facial engagement so as to preclude proper operation of the power transmission system.

In the conventional V-belt formed of rubber, inaccuracies in the angularity of the side surfaces of the V-belt relative to the sidewall surfaces of the pulley also causes increased wear, heat, and noise. Because the V-belts are formed of a resilient material, such as synthetic resin or rubber, however, they may be caused to accommodate the angular difference by tensioning the belt sufficiently to deform the belt side surfaces into facial engagement with the pulley sidewall surfaces.

DISCLOSURE OF INVENTION

The present invention solves this vexation problem in a novel and simple manner.

More specifically, the invention comprehends providing means on opposite sides of the midportion of such a belt for freely adjustably mounting a plurality of side elements arranged longitudinally of the belt so as to permit the outer surfaces of the side elements to accurately facially engage the sidewall surfaces of the pulley groove when entrained therewith.

In the illustrated embodiment, the midportion of the belt comprises a plurality of links having through openings at their opposite ends and a plurality of pins extending through aligned openings of the links so as to form a continuous chain-type power transmission belt midportion.

The opposite ends of the pins protrude from the side edge portions of the midportion and define means for freely adjustably mounting the side elements thereto.

In the illustrated embodiment, the protruding portion of the pins comprises a substantially spherical end, and the side elements are provided with a complementary spherical recess. The pin end may be slightly undersized relative to the side element recess so as to permit ready mounting of the side element on the pin end, with the spherical end portion captured within the recess of the side element, while permitting ready adjustable positioning of the side element thereon.

The invention further comprehends the provision of means for generally aligning the outer surfaces of the side elements with the confronting sidewall surfaces of the pulley. In one form, the positioning means comprises resilient means engaged by the inner surface of the side element which tends to hold the side element with the outer surface thereof at the normal angle of the pulley groove sidewall. The resiliency of the positioning element permits the side element to move into accurate facial engagement with the pulley groove sidewall surface when the side element is engaged therewith.

In another form, the positioning means comprises a rigid element having an outer surface inclined at the normal pulley sidewall surface angle, and the side element inner surface is spaced slightly outwardly therefrom so as to permit free movement between the side element and positioning means to accommodate any difference between the angularity of the outer surface of the side element and the sidewall surface of the pulley groove.

The side element may be formed of metal and, in one embodiment, is provided with a fusion-bonded ceramic layer on the outer surface.

The invention further comprehends the provision of lubricating passages in the side elements for delivering lubricating oil therethrough to the pin ends to assure free adjustability in the mounting of the side elements on the pin ends.

In one form, the outer surface of the side elements is provided with a recess opening toward the sidewall surface on the pulley groove for retaining lubricating oil and one of the lubricating passages may open from the recess to the pin end.

In one form, the side elements are provided with slots on the inner surface thereof for providing further lubricating oil passages to the pin end.

The improved adjustable edge V-belt structure of the invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a power transmission system utilizing a power transmission V-belt embodying the invention;

FIG. 2 is a fragmentary perspective view of a preferred form of the V-belt structure of the invention;

FIG. 3 is a fragmentary section thereof;

FIG. 4 is an enlarged fragmentary section thereof;

FIG. 5 is a section of the side element thereof;

FIG. 6 is a fragmentary section of the pin end;

FIG. 9 is a section of a power transmission system utilizing a modified form of side element embodying the invention;

BEST MODE FOR CARRYING OUT THE INVENTION

Figure 7:
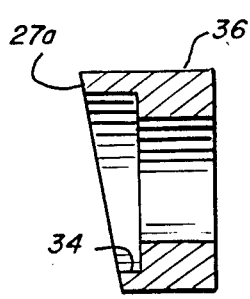
FIG. 7 is a section of the preferred positioning element.
Figure 8:
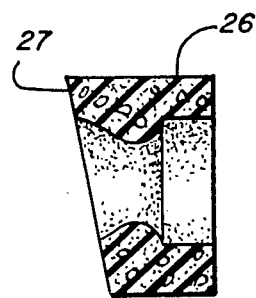
FIG. 8 is a section of a modified form of positioning element suitable for use in the invention.

In the illustrative embodiment of the invention as disclosed in the drawing, a power transmission V-belt generally designated 10 is shown to comprise a midportion generally designated 11 defined by a plurality of interconnected links 12. Each link has an opening 13 at its opposite ends, and the links are interconnected by means of pins 14 having opposite ends 15 protruding from the opposite sides of the midportion 11. A plurality of side elements 16 are mounted to the protruding ends 15 of the pins in a spaced array longitudinally of the belt, as seen in FIGS. 1 and 2.

The invention comprehends that the side elements 16 be mounted on the pin ends to be freely adjustably positionable thereon so as to dispose the outer surfaces 17 of the side elements accurately parallel to the inwardly facing sidewall surfaces 18 of the groove 19 of the pulleys 20 and 21 about which the belt is trained.

As shown in FIG. 5, each side element 16 further defines an inner surface 22. A spherical recess 23 opens inwardly through surface 22 and, as illustrated in FIGS. 5 and 6, has a diameter slightly larger than the diameter of the spherical end 15 of the pin 14, so that the pin end may be movably captured within recess 23. For this purpose, as shown in FIG. 5, the recess 23 extends slightly more than 180°.

It is only necessary that the spherical end 15 be insertable into the recess 23 and effectively retained thereon by the overlapping portions at the top and bottom of the recess. Thus, the side element is effectively retained on the pin end while permitting free universal adjustability thereof on the pin. Such adjustability permits ready repositioning of the outer surface 17 so as to permit it to become accurately facially engaged with the pulley surface 18.

Inner surface 22 may further be provided with an annular chamfer 24 extending coaxially about the center of the recess 23 and defining means for guiding the side element onto the pin end 15.

Similarly, outer surface 17 may be provided with a coaxial annular chamfer 25 for guiding the side element into the pulley groove 19 as the side element moves into the groove.

The invention further comprehends the provision of means for assuring that the side elements will have the outer surfaces thereof generally aligned with the sidewall surfaces 18 of the pulley grooves with which they are engaged when the belt is trained about the pulley. Thus, as seen in FIG. 3 and 4, positioning means generally designated 26 are provided interposed between the side edges 27 of the belt midportion 11 and the inner surface 22 of the side elements. In the embodiment of FIGS. 1–5, the positioning means comprises resilient elements mounted one each to the opposite ends of the pins 14 inwardly of the spherical end 15 thereof, and defining an outer surface 27 extending at the same angle as the pulley surface 18 relative to the pulley groove centerline 28. The side element 16 abuts the surface 27 and the resiliency of the element 26 permits slight adjustment thereof on the spherical pin end 15 within the necessary small angular range.

In the preferred embodiment, the side element is provided with at least one through oil passage and, as shown in FIG. 5, may include three such oil passages 29, 30 and 31 for conducting lubricating oil from exteriorly of the side element to the pin end 15. One or more of the oil passages may extend generally vertically and one or more may extend generally horizontally through the side element to provide the desired lubrication for improved facilitated free adjustment of the side element on the pin end.

The invention further comprehends the provision of a recess 32 in the outer surface 17 into which oil passage 30 may open. The recess, as shown in FIG. 4, may comprise a segmentally cylindrical recess arranged to trap lubricating oil urged thereinto from the pulley sidewall surface 18, further enhancing the delivery of the lubricating oil to the pin end.

As still further shown in the drawing, the side element 16 may be provided with a plurality of radially extending, inwardly opening slots 33 in the inner surface 22 thereof. Slots 33 provide further means for conducting lubricating oil to the pin end.

Illustratively, the positioning elements 26 may be formed of rubber or synthetic resin and define an outer surface 37 extending in a plane at an angle to the vertical center plane of the belt similar to the angle of the pulley groove sidewall surface 18. Thus, the resilient positioning elements 36 dispose the outer surface 17 of the side elements normally at the nominal angle of the pulley sidewall surfaces 18, and any variation therof from the normal angle may be readily accommodated by the permitted resilient adjustment of the side elements against the positioning element by the force of engagement of the outer surfaces 17 with the pulley sidewall surfaces 18 when the side element is brought into the groove 19.

In the illustrated embodiment, the side element is formed of a rigid material, such as metal or synthetic resin. In the embodiment of FIGS. 1–5, the side element is provided with an outer coating layer 35 of a suitable wear-resistant material, such as a ceramic.

Thus, as discussed above, the invention comprehends the provision of an improved V-belt structure 11 having a flexible midportion defining opposite laterally outer side portions from which mounting elements protrude at spaced intervals longitudinally of the belt midportion. Side elements are freely adjustably mounted one each to the protruding mounting elements and define an outer surface for engaging, in accurate face-to-face surface, the drive pulley V-groove wall surface. The invention may further include the provision of positioning means for retaining the side elements on the mounting elements with the outer surfaces generally parallel to the V-groove sidewall surfaces for facilitating the accurate facial engagement of the side elements with the sidewall of the pulley groove when brought thereinto.

The invention further comprehends the use of different forms of positioning means, such as a rigid positioning element 36 illustrated in FIG. 9 retained between the inner surface 22 of the side elements 16 and the outer surface 27 of the chain midportion 11.

As seen in FIG. 9, the positioning element 36 defines an undercut annular space 34 adapted to receive lubricating oil passed inwardly from exteriorly of the side elements through the slots 33 and a space 39a between outer surface 27 of the positioning means and inner surface 22 of the side elements, thereby defining a reservoir for lubricating oil, further ensuring free adjustability of the side elements on the spherical pin end.

The invention further comprehends the provision of the side elements free of the through oil passages, with the lubrication of the pin end being effected by the spacing of the side elements from the outer surface of the positioning means where the positioning means comprises a rigid element.

Figure 10:
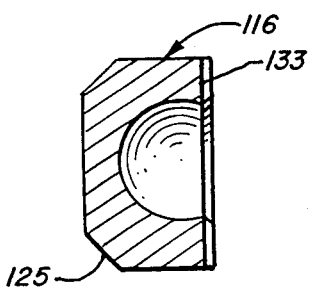
FIG. 10 is a section of a further modified form of side element embodying the invention.

Thus, as seen in FIG. 10, a side element 116 may comprise a side element similar to side element 16 but having no through oil passages and no recess in the outer surface. The side element 116 may be provided with slots 133 for use thereof with the resilient positioning element 26. Side element 116 may include an outer chamfer 125.

Figure 11:
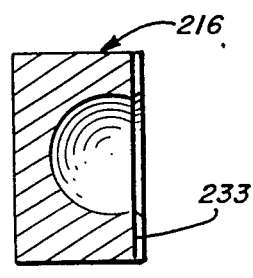
FIG. 11 is a section of still another modified form of side element embodying the invention.

Another modified form of side element is shown in FIG. 11 to comprise a side element generally designated 216 similar to side element 116, but having no chamfer in the outer surface.

Figure 12:
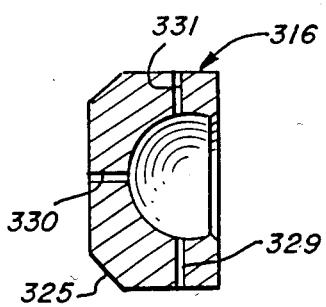
FIG. 12 is a section of still another modified form of side element embodying the invention.

Still another modified form of side element generally designated 316 is shown in FIG. 12 to comprise a side element generally similar to side element 116, but being provided with through oil passages, such as passages 329, 330, and 331. The side element 316 further includes an outer chamfer 325.

Figure 13:
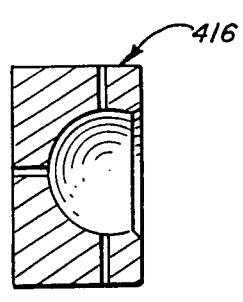
FIG. 13 is a section of yet another modified form of side element embodying the invention.

Illustrated in FIG. 13 is a side element generally designated 416 which is similar to side element 316, but wherein no outer chamfer is provided.

Figure 14:
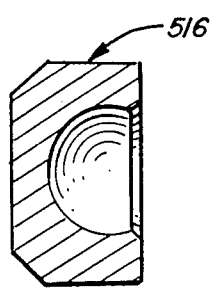
FIG. 14 is a section of a further modified form of side element embodying the invention.

A further modified form of side element generally designated 516 is shown in FIG. 14 to comprise a side element similar to side element 116 but having no inner slots, such as the slots 133 of side element 116.

Figure 15:
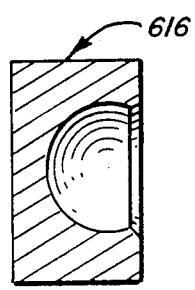
FIG. 15 is a section of another modified form of side element embodying the invention.

A modified form of side element generally designated 616 is shown in FIG. 15 to comprise a side element similar to side element 216, but having no inner slots, such as slots 233 or side element 216.

Figure 16:
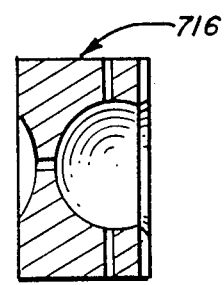
FIG. 16 is a section of still another modified form of side element embodying the invention.

Another form of side element generally designated 716 is illustrated in FIG. 16 to comprise a side element generally similar to side element 16 but having no outer chamfer, such as chamfer 25 of side element 16.

The different modified forms of side elements and positioning elements are illustrative only, it being understood that other combinations and permutations of the structural characteristics of the different side elements may be utilized within the broad scope of the invention.

Where the resilient positioning means is utilized, it is preferred that the oil passages and slots be provided in the side elements to afford the necessary lubrication of the contact between the pin end and side element in the inner spherical recess thereof.

INDUSTRIAL APPLICABILITY

The power transmission belts of the present invention are adapted for driving high power loads with improved efficiency and positive driving action. They may be used in general industry in the driving of machinery, as well as in automotive power transmissions. The assured facial engagement between the outer surfaces of the side elements and the confronting surfaces of the pulley groove sidewalls provides for positive force transfer between the power transmission belt and pulleys for improved efficiency in the operation of the drive system and for positive operation of the system such as during braking. In the conventional pulley system, the surfaces of the sidewalls of the grooves is within a range of included angles of from 12 to 30°, and commonly, approximately 20°. The present invention includes means for assuring that the outer surfaces of the side elements are disposed at a corresponding angle for facilitated minor readjustment in accurately facially engaging the side surfaces of the pulley grooves.

For facilitating mounting of the adjusting member, it may be provided in the form of a link disposed outwardly of the outermost link of the outermost chain midportion of the belt, as seen in FIG. 2. Thus, a pair of pins 14 may be utilized in retaining the positioning member in the structure inwardly of the side elements. By utilizing a pair of such pins, the positioning element may be accurately retained, with the outer surface 37 thereof at the pulley groove sidewall angle.

As will be obvious to those skilled in the art, other forms of mounting elements, positioning elements, and side elements may be utilized within the broad scope of the invention. The examples discussed above are intended to be exemplary as illustrative of the inventive concepts of the invention.

The foregoing disclosure of specific embodiments is illustrative of the broad inventive concepts comprehended by the invention.

We claim:

1. A chain-type power transmission V-belt for use with a pulley having a groove defining converging opposite sidewalls, said V-belt comprising:
    a plurality of links each having opposite ends provided with a through opening;
    a plurality of pins for retaining said links in side-by-side relationship to define a longitudinally continuous flexible chain arrangement having a flatwise extent, said pins extending through aligned ones of said through openings and defining opposite ends;
    a plurality of side elements each defining an outer surface and an inner surface, said side elements having means associated therewith for freely adjustably mounting the side elements one each on said opposite ends of said plurality of pins, with said outer surfaces disposed outermost laterally of the chain arrangement for engaging the sidewalls of a pulley groove; and
    positioning means for causing the side elements to have said outer surfaces adjustably disposed at an angle to said flatwise extent of said chain arrangement corresponding to the angle of said sidewalls of the pulley being engaged by the outer surface of the side elements.

2. The V-belt structure of claim 1 wherein said opposite ends of the pins comprise spherical ends.

3. The V-belt structure of claim 1 wherein each side element is provided with at least one through passage for conducting lubricating oil from exteriorly of the side elements to the pin end.

4. The V-belt structure of claim 1 wherein each side element defines an annular chamfer about said outer surface for guiding the side element into the pulley groove.

5. The V-belt structure of claim 1 wherein the inner surface of each side element is provided with a slot extending from exteriorly of the side element to the pin end.

6. The V-belt structure of claim 1 wherein each side element is provided with a recess in the outer surface thereof and a through opening extending from said recess to the pin end for conducting lubricating oil from said recess to said pin end.

7. The V-belt structure of claim 1 wherein each side element is provided with a plurality of through passages for conducting lubricating oil from exteriorly of the side element to the pin end, at least one of said through passages opening through said outer surface.

8. The V-belt structure of claim 1 wherein said side elements comprise metal elements.

9. The V-belt structure of claim 1 wherein said side elements comprise metal elements having a ceramic coating on said outer surface.

10. The V-belt structure of claim 1 wherein said side elements are provided with a fusion-bonded, wear-resistant layer on the outer surface thereof.

11. The V-belt structure of claim 1 wherein said positioning means comprises rigid elements disposed inwardly of said side elements at opposite sides of said chain arrangement of the links.

12. The V-belt structure of claim 1 wherein said positioning means comprises resilient elements disposed inwardly of said side elements at opposite sides of said chain arrangement of the links.

13. The V-belt structure of claim 1 wherein said side elements are slidably mounted to said pin ends.

14. The V-belt structure of claim 1 wherein said side elements are rotatably mounted to said pin ends.

15. The V-belt structure of claim 1 wherein said side elements are swivelly mounted to said pin ends.

16. The V-belt structure of claim 1 wherein said inner surfaces of said side elements engage said positioning means.

17. The V-belt structure of claim 1 wherein said positioning means comprises resilient elements disposed inwardly of said side elements at opposite sides of said chain arrangement of the links, and said inner surfaces of said side elements compressively engage said resilient positioning elements to be urged by said positioning elements to said angle to the flatwise extent of the chain arrangement.

18. A V-belt comprising:
a flexible midportion defining a longitudinally continuous belt portion having opposite laterally outer side portions;
mounting elements protruding from said side portion at spaced intervals longitudinally of the belt portion; and
side elements freely adjustably mounted one each to side protruding mounting elements, said side elements defining an outer surface for engaging the sidewall of a drive pulley V-groove, said side elements being disposed on said mounting elements to have said outer surfaces thereof normally substantially parallel to the drive pulley V-groove and the freely adjustable mounting of the side elements on said mounting elements permitting said side element outer surfaces to be disposed in accurately face-to-face contact with the pulley groove sidewall when engaged therewith.

19. The V-belt of claim 18 wherein each side element is provided with oil passages for conducting lubricating oil from exteriorly of the side element to the mounting element.

20. The V-belt of claim 18 wherein said side elements are swivelly mounted to said mounting elements.

21. The V-belt of claim 18 wherein each side element defines a guide surface extending about said outer surface for guiding the side element into the pulley groove.

22. A V-belt comprising:
a flexible midportion defining a longitudinally continuous belt portion having opposite laterally outer side portions;
mounting elements protruding from said side portion at spaced intervals longitudinally of the belt portion;
side elements freely adjustably mounted one each to said protruding mounting elements, said side elements defining an outer surface for engaging the sidewall of a drive pulley V-groove; and
positioning means for retaining said side elements on said mounting elements with said outer surfaces generally parallel to the V-groove sidewall for facilitating facial engagement of the side element with the sidewall of the pulley groove when brought into the pulley groove.

23. The V-belt of claim 22 wherein said positioning means comprises resilient means.

24. The V-belt of claim 22 wherein said positioning means comprises rigid means.

25. The V-belt of claim 22 wherein each side element is provided with oil passages for conducting lubricating oil from exteriorly of the side element to the mounting element.

26. The V-belt of claim 22 wherein said side elements are swivelly mounted to said mounting elements.

27. The V-belt of claim 22 wherein each side element defines a guide surface extending about said outer surface for guiding the side element into the pulley groove

* * * * *